FIG. 3a

INVENTOR.
ALEXANDER M. FILIPOV
BY
Lawrence S Epstein
ATTORNEYS

Jan. 16, 1968 — A. M. FILIPOV — 3,363,329
ELECTRICAL CIRCUIT FOR A SIMULATED RADIOACTIVE RADIATION DETECTOR
Filed Sept. 4, 1964 — 11 Sheets-Sheet 5

FIG. 3c

INVENTOR
ALEXANDER M. FILIPOV
BY
Lawrence S. Epstein
ATTORNEYS

Jan. 16, 1968     A. M. FILIPOV     3,363,329
ELECTRICAL CIRCUIT FOR A SIMULATED
RADIOACTIVE RADIATION DETECTOR Filed Sept. 4, 1964     11 Sheets-Sheet 7

INVENTOR.
ALEXANDER M. FILIPOV
BY
*Lawrence S. Epstein*
ATTORNEYS

INVENTOR.
ALEXANDER M. FILIPOV
BY
Lawrence S. Epstein
ATTORNEYS

United States Patent Office 3,363,329
Patented Jan. 16, 1968

3,363,329
ELECTRICAL CIRCUIT FOR A SIMULATED RADIOACTIVE RADIATION DETECTOR
Alexander M. Filipov, Concord, Mass., assignor, by mesne assignments, to the United States of America as represented by the Secretary of the Navy
Filed Sept. 4, 1964, Ser. No. 394,642
8 Claims. (Cl. 35—1)

ABSTRACT OF THE DISCLOSURE

A simulated radioactive radiation meter comprising a source of pulses of primary radiation of a first radiation frequency, photomultiplier means for receiving pulses of secondary radiation of a second radiation frequency from a substance in response to radiation of said first frequency directed thereon, said photomultiplier means providing voltage pulses corresponding to the intensities of said pulses of said secondary radiation, voltage pulse detecting means comprising fast time response filter means and rectifier means connected to said photomultiplier means and providing a direct current voltage signal which is proportional to the intensity of secondary radiation incident on said photomultiplier means, zener diode random electrical pulse generating means coupled to said voltage pulse detecting means and including modulating means responsive to said direct current voltage signal to provide a random electrical pulse output having an average rate of occurrence which is directly proportional to said direct current voltage signal, and also including non-linearity compensating means and limiter means, the latter for simulating saturation characteristics of an operative radiation meter, and indicator means coupled to said random pulse generating means for providing an indication of said random electrical pulse output.

---

This invention relates to simulated radioactive radiation meters and to associated circuitry used therewith. This associated circuitry includes: a frequency controllable noise generator and a dual polarity direct current voltage source.

In training individuals in the detection of radioactive materials it is desired to simulate actual radioactive conditions as closely as possible and in particular, to realistically simulate the actual mode of operation of conventional radioactive radiation meters during the detection operation, without endangering the operator.

This has been accomplished in the prior art, by utilizing substances which are capable of emitting secondary radiation having a different wave-length than incident primary radiation directed thereon. Fluorescent and phosphorescent materials are examples of such substances.

More information describing this effect can be found in co-pending application No. 304,704, filed Aug. 26, 1963, now Patent No. 3,208,159. The prior art devices which take advantage of this effect utilize a radiation meter capable of detecting and indicating the resultant secondary radiation, which ordinarily would include a probe unit and a main meter unit electrically connected to one another. Such a radiation meter would be physically identical in outward appearance to conventional radioactive radiation meters, thereby providing realistic training. The probe unit, thereof, would contain a source of primary radiation of a first frequency, which would be positioned so as to direct the primary radiation toward the object coated by the fluorescent or phosphorescent material, referred to as the "contaminant." The resulting secondary radiation would then be detected by a detection means, in the same unit, which is capable of discriminating between the primary radiation and the emergent secondary radiation. Signals induced by the detected secondary radiation would then be coupled to the main meter unit, containing an amplifier, and a meter. Such signals would then be amplified and visually indicated by the meter connected to the output of the aforementioned amplifier. The deflection of the needle will be affected by the intensity of the primary source of radiation, the amount of contaminant, and the distance between the probe unit and the contaminant, among other factors. Patent literature which discusses simulated radioactive detection techniques and devices include United States Patent 2,900,740.

Radioactive materials emit alpha particles in a random fashion, thereby effecting a random type of indication in an actual radioactive radiation meter located near such radioactive material. In the prior art device this effect, the random effect in the output indicator is not provided.

One of the objects, therefore, of this invention, is to provide a very realistic simulated radioactive radiation meter.

Another object of the invention is to provide a simulated radioactive radiation meter capable of simulating the action resulting from random emission characteristics of radioactive elements.

A further object of the invention is to provide an improved simulated radioactive radiation meter.

An additional object of the invention is to provide an improved triggering-detector system for a simulated radioactive radiation meter.

A still further object of the invention is to provide a very realistic simulated radioactive radiation meter, which is capable of simulating the results of random emissions of radioactive materials.

A further object of the invention is to provide an improved frequency controllable noise generator.

A still further object of the invention is to provide an improved dual polarity direct current voltage source.

Other objects and many of the attendant advantages of this invention will be readily appreciated as the same becomes better understood by reference to the following detailed description when considered in connection with the accompanying drawings wherein:

Similar numerals refer to similar parts throughout the several views.

Basically, this device includes a triggering means and a detector means. Such device can be sub-divided into four basic sections; a triggering section, an optical section, a detector section, and a rate meter section.

General description and operation

Figure 1:
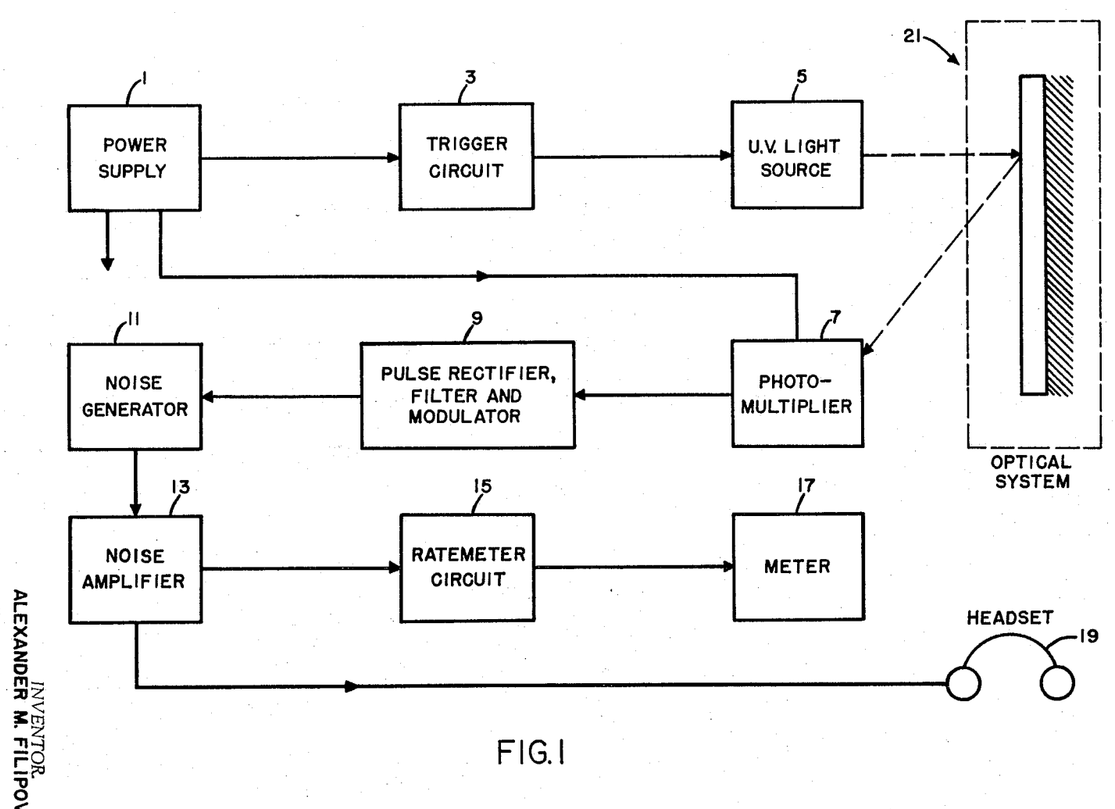
FIG. 1 is a simplified functional block diagram of one form of the simulated radioactive radiation meter which includes the invention.

With reference to the drawing in FIG. 1, the device generally includes; a power supply 1, a trigger circuit 3, coupled to said power supply, and an ultra-violet light source 5, referred to as a U.V. light source, which is coupled to said trigger circuit. The power supply 1, is also coupled to a photomultiplier 7, which is in turn coupled to a pulse rectifier, filter and modulator circuit 9, and said latter circuit is coupled to a noise generator 11. The noise generator 11, is then coupled to a noise amplifier 13. This noise amplifier is then coupled to two different circuits, the first of which includes a ratemeter circuit 15, having its output coupled to a meter 17. The second portion of the circuit is coupled from the noise amplifier 13, to an ordinary head set 19. Additionally, the ultra-violet source 5, and photomultiplier 7 (have associated therewith an optical system 21, which is used to direct primary radiation of first frequency toward a surface to be tested which has thereon a suitable phosphor, and which would emit secondary radiation of a second frequency in response to the primary radiation of the first frequency. Said optical system would direct the picked up secondary radiation to the photomultiplier 7, where said secondary radiation would be detected.

Still referring to FIG. 1, the power supply 1, generates a plus and minus 800 volts DC output voltage, and supplies the plus 800 volts to the triggering circuit circuit 3, which includes a triggering tube and a transformer which discharges a capacitor, which is charged up by the plus 800 volts, through a U.V. flash tube which is part of the U.V. light source 5, at about twenty times per second. This U.V. light of a first frequency is focused by the optical system 21, to a spot about one inch outside the overall instrument. If the U.V. light beam of the first frequency strikes the surface within this focus distance and that surface is coated with a special phosphor, emission of radiation of a secondary frequency would result. This secondary emission would produce light at a longer wave length. Some of this light would re-enter the device through a window and be reflected from a mirror system to the photomultiplier 7, as described infra, as the U.V. flash tube results in pulses of light at the photo multiplier's output when these light pulses are detected, and would consist of short pulses of light at the repetition rate at which the U.V. light source 5 has been pulsed. These pulses detected are of a height or amplitude which is determined by the amount of phosphor on the object being surveyed, by the proximity to the phosphor, and hence by the intensity of the reflected light. These detected pulses are then rectified and filtered to produce a DC voltage which is a measure of the average light intensity of the phosphor. This DC voltage is then amplified and used as a bias to vary the number of randomly spaced pulses generated by a silicon zener break-down diode. The resulting frequency controlled random noise pulses are themselves amplified by the noise amplifier 13, and standardized in height and shape. They may then be heard in the head set 19. The same pulses are simultaneously coupled to a ratemeter circuit 15, which causes a sensitive meter 17, coupled thereto to deflect in accordance with the rate which the pulses arrive.

Figure 2:
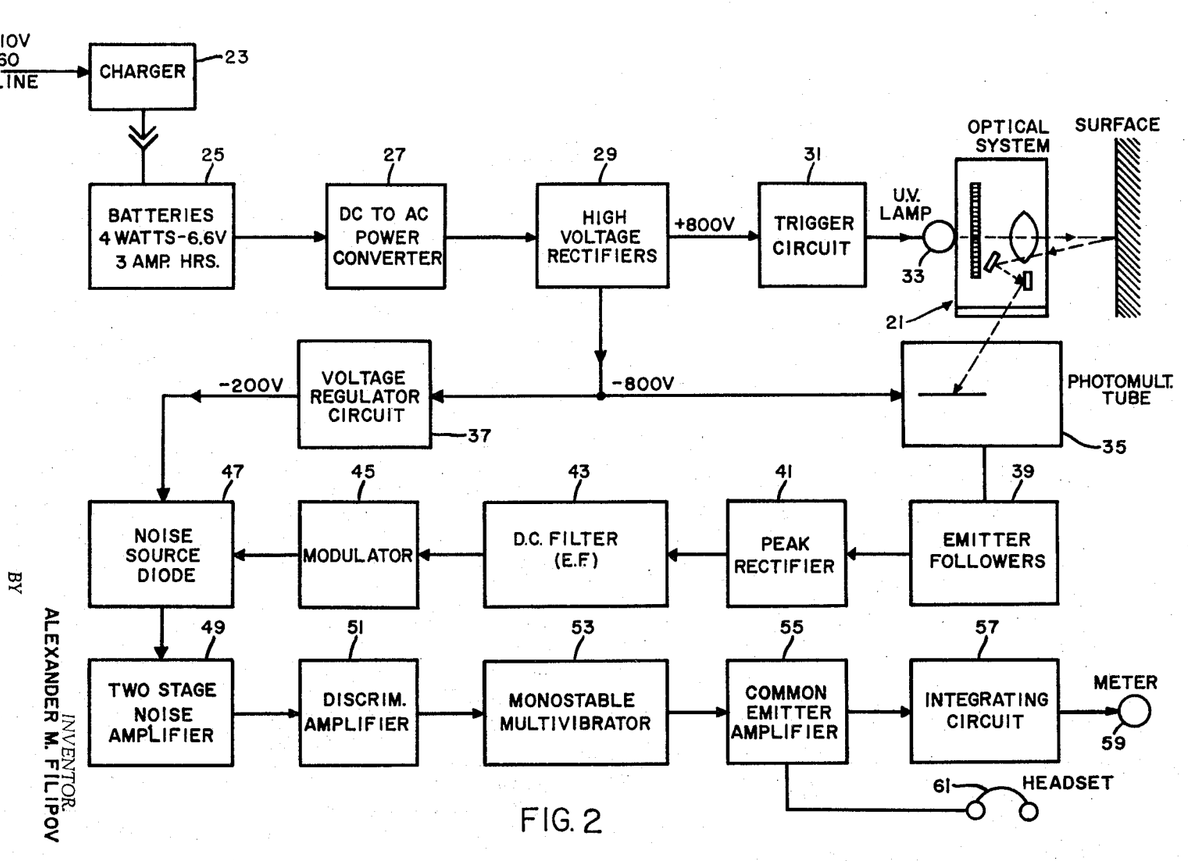
FIG. 2 is a functional block diagram of one form of the simulated radioactive radiation meter which includes the invention.
Figure 3A:
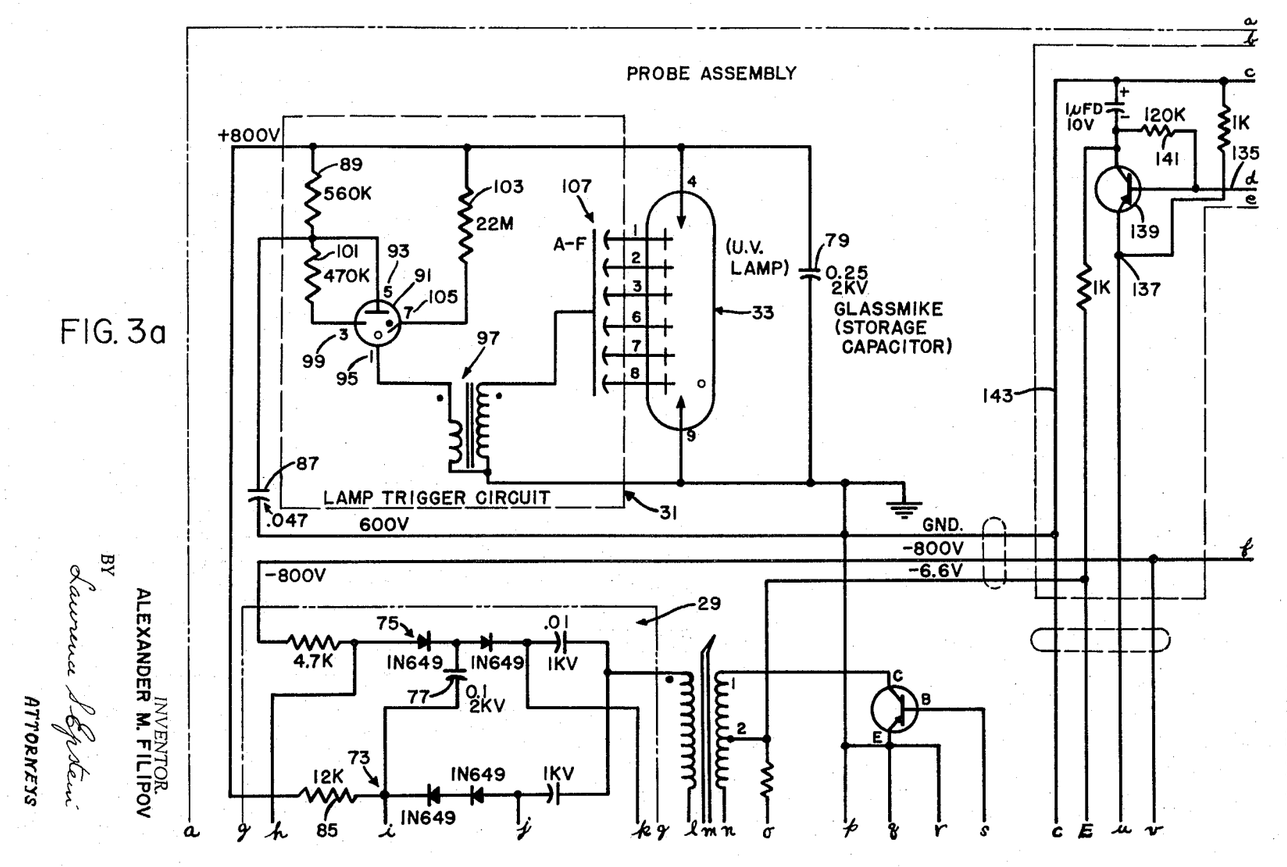
FIG. 3 is a detailed schematic diagram of the preferred form of the simulated radioactive radiation meter.
Figure 3B:
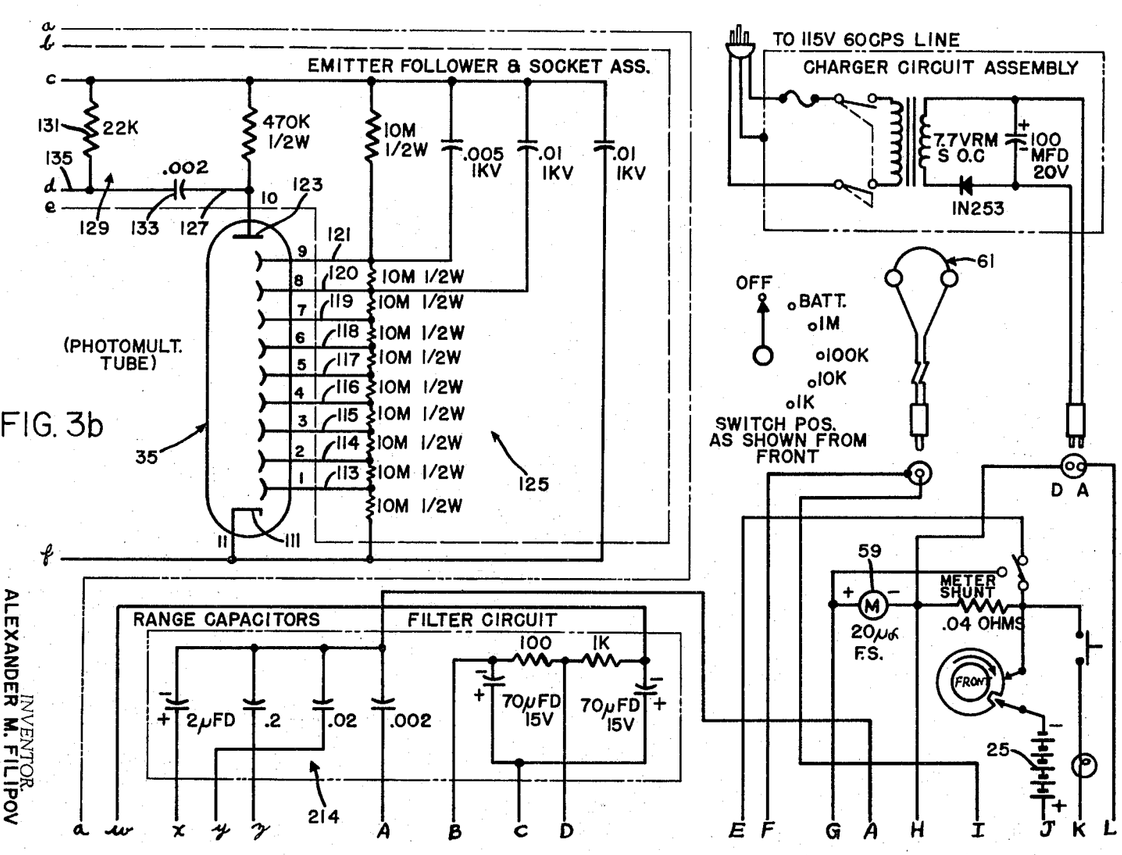
Figure 3C:
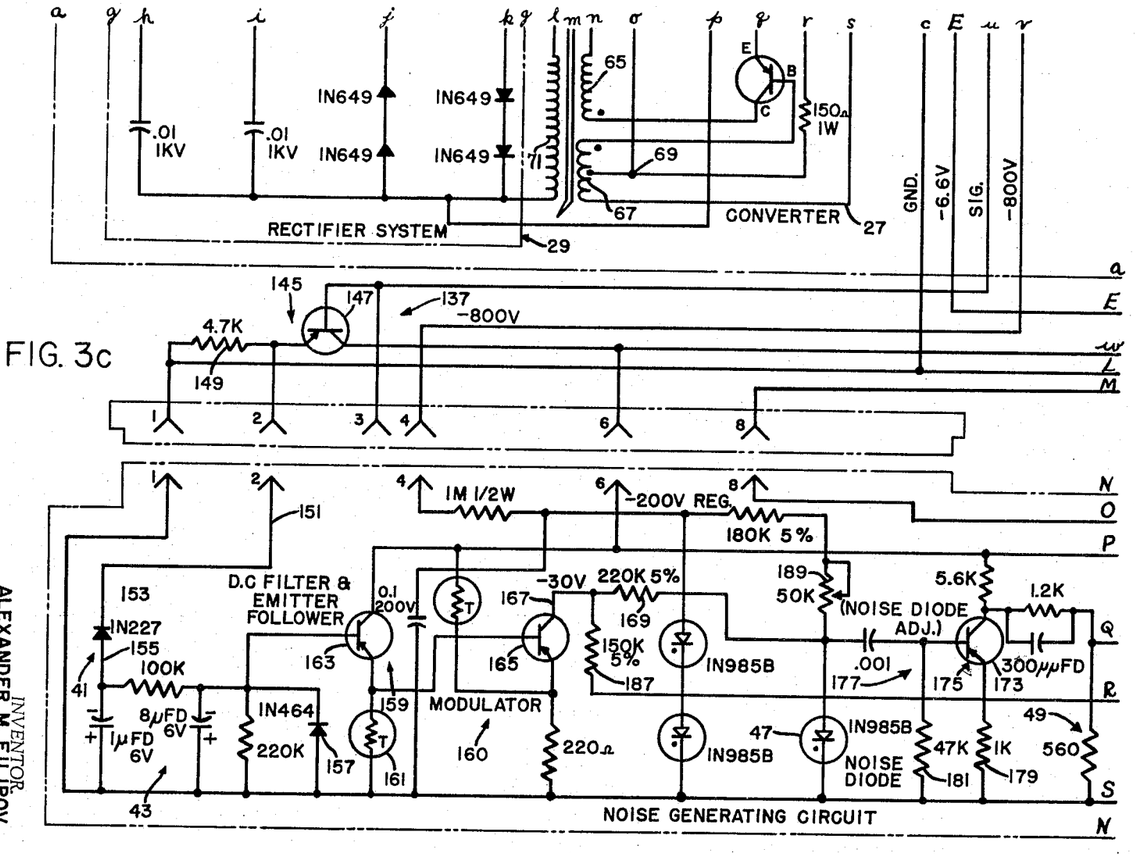
Figure 3D:
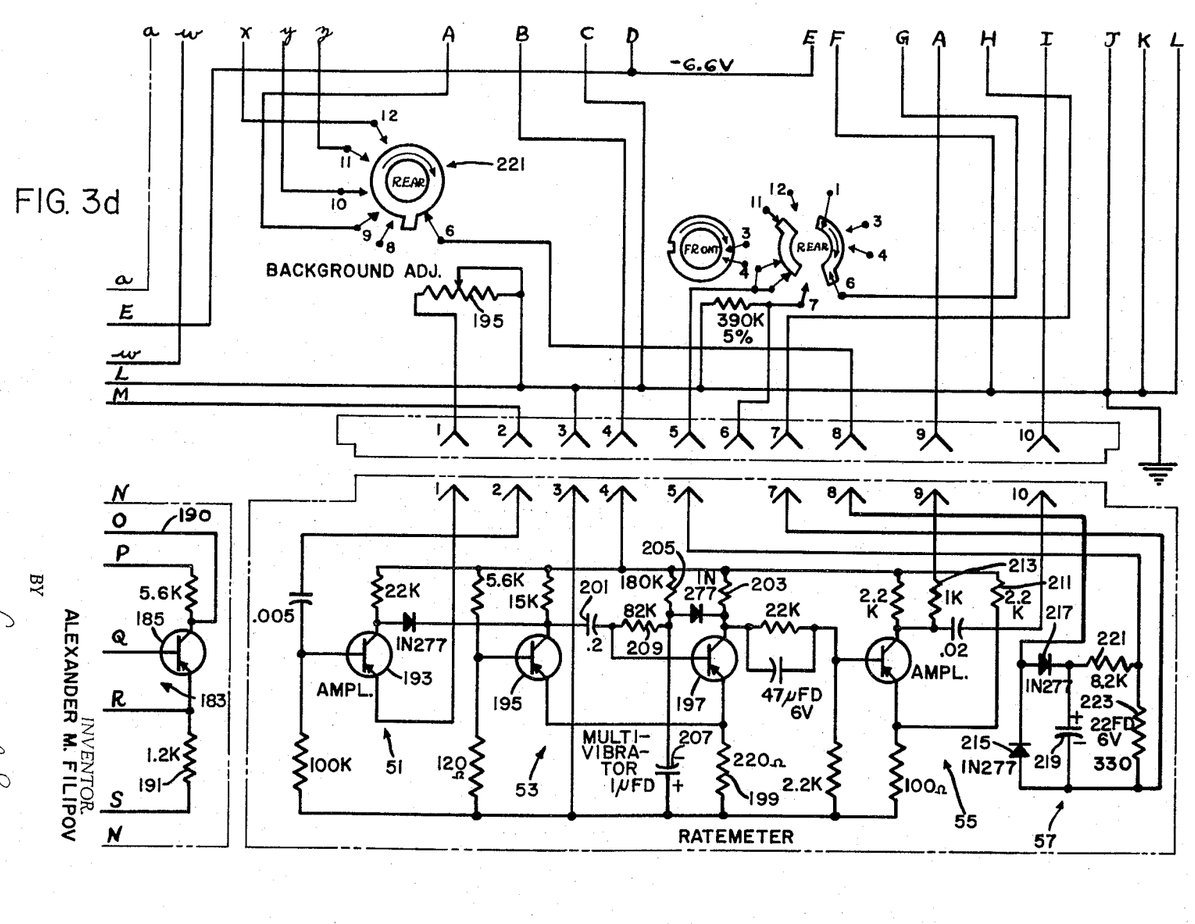

Such operation is described in more detail in the description of the operation of the device illustrated in FIG. 2 and subsequent figures.

A detailed explanation and theory behind the emission of secondary radiation from fluorescent and phosphorescent materials is described in co-pending application No. 304,704, filed Aug. 26, 1963.

Such theory is also described in the patent to Brault, 2,990,740, issued Aug. 25, 1959. The Brault patent additionally describes a simple optical system which could be used with the instant invention.

An optical system which may be used in this device is also described in detail therein:

General description FIGURE 2

With reference to the drawing in FIG. 2, the device generally includes: a charger 23, which may be used to charge a battery supply 25, coupled thereto. The batteries 25, are then coupled to a DC to AC power converter 27, and the output of said DC to AC power converter 27, is then coupled to a dual polarity direct current voltage source 29. One output of this voltage source 29, is coupled to a trigger circuit 31, whose output is then coupled to a U.V. lamp 33, having an associated optical system 21. Also, the other output of the dual polarity DC voltage source 29, has its output coupled to a photomultiplier tube 35 and to a voltage regulator circuit 27. The output of the photomultiplier tube 35 is coupled to emitter follower stages 39 and the output of the emitter followers 39 are then coupled to the input of a peak rectifier circuit 41. The output of this peak rectifier circuit 41, is then coupled to the input of a DC filter 43, which has its output coupled to the input of an emitter follower (not shown). The output of the emitter follower is then coupled to a modulator circuit 45. This modulator 45 is in turn coupled to a noise source diode 47. The voltage regulator circuit 37, provides a minus 200 volts output to the noise source diode 47, so as to provide biasing for said circuit. The output of the noise source diode 47 is then coupled to a two-stage noise amplifier 49, and the output of the modulator 45 is coupled to the second stage of the two-stage noise amplifier 49. The output of this two-stage noise amplifier 49, is then coupled to a discriminator amplifier 51. The output of this discriminator amplifier 51, is then coupled to the input of a monostable multivibrator 53. The output of this monostable multivibrator 53, is then coupled to the input of a common emitter amplifier 55, which has two outputs. The first output is coupled to an integrator circuit 57, which has its output coupled to a meter 59. The second output of the common emitter amplifier 55 is coupled directly to a head set 61.

General operation, FIGURE 2

The six-volt battery supply 25, provides power for the DC to AC power converter 27, which converts the DC supply output to a 400 volt square wave output. This 400 volt square wave output is then coupled to an input of dual polarity direct current voltage source 29. This dual polarity DC voltage source 29, provides both a positive 800 volt DC voltage and a negative 800 volt direct current voltage. The positive 800 DC voltage is applied to the trigger circuit 31. The trigger circuit 31 provides high voltage pulses which are used to trigger the ultra-violet lamp 33 so as to provide pulses of ultra-violet light which are then directed through the optical system 21, associated therewith, so as to provide radiation pulses of a first frequency which are then directed toward a surface having a special phosphor coating. If this special phosphor is within the range of said optical system 21, a pulse of secondary radiation of a second frequency results from the incident pulse of the first frequency which is directed thereon. This pulse of secondary radiation of a second frequency is then directed through said optical system 21 through a photomultiplier tube 35. This photomultiplier tube 35, produces, at its output, a pulse output signal, which is proportional in amplitude to the intensity of the incident light which is detected. Because of the filtering provided, only light of a particular frequency will actually be detected. This is of a frequency which is longer than the primary incident radiation directed on the phosphor coated surface. The emitter follower unit 39, is used to transmit and amplify only AC signals coupled to its input, which are a result of the light pulses which are detected by the photomultiplier tube 35. At the output of the emitter follower section 39 there results a plurality of pulses at a frequency equal to the frequency at which the ultra-violet lamp has been pulsed, which pulses are negative in polarity and of approximately one and one-half microseconds in width in this preferred embodiment. This pulse train is then coupled to a peak rectifier circuit 41 which rectifies said pulses thereby providing a unipolar output. Said unipolar output voltage is then fed to a DC filter, emitter follower combination 43. The filter section provides a DC output voltage to the following emitter follower of this combination. However the output of the filter section is not a constant DC voltage. This is because, as will later be seen, if such voltage did not vary, no modulation of the noise source would be produced. A compromise must be made in the time constant of the filter section as it is desired to provide a pure DC output voltage at the output of the filter, and yet make such filter with a fast response. The two, however, are inconsistent, and therefore, a compromise must be arrived at. Just what would be seen at the output of the DC filter and emitter follower combination 43, would be an amplified, slowly varying, AC voltage. This signal then coupled to the input of a modulator 45, which has one of its outputs coupled to a noise source diode 47. The output of the modulator 45 which is coupled to the noise source diode 47 is used to modulate said noise source diode 47, so as to vary the average rate of occurrence or frequency of said noise source diodes random noise output pulses which are produced thereby. The output of the modulator 45, is additionally coupled to the second stage of a two-stage noise amplifier 49. The output of the noise source diode 47, which produces unipolar random noise output pulses of an average rate of occurrence of a particular frequency, which is controlled by the output of the modulator 45 is then fed to the first stage of the two-stage noise amplifier 49. Said unipolar negative noise pulses are subsequently fed to the second of the two-stage noise amplifier 49. This second stage of the two-stage noise amplifier 49, provides limiting so as to achieve some form of compensation for the non-linearity of the noise source diode 47. The amplified pulse output of this two-stage noise amplifier is then fed to the input of a discriminator amplifier 51, which is so designed as to eliminate small signal inputs coupled thereto from being amplified. Only those signals which exceed a certain pre-determined threshold value have their differences amplified by said discriminator amplifier 51. This threshold level as will be described later, may be varied so as to control the "background count." These resulting output pulses from the discriminator amplifier 51, output are then coupled to the input of a monostable multivibrator 53, which produces at its output a train of squares waves at the same repetition rate as the input pulses coupled to said monostable multivibrator 53. Of course, if the frequency of the input noise pulses to the monostable multivibrator exceed a certain value there will be coincidence with a resulting loss in the count rate. This is obviated, as will subsequently be described, by varying the RC coupling network which is used to determine the width of the output square wave voltage developed by said monostable multivibrator 53.

The output square waves are then coupled to the input of a common emitter amplifier 55, which inverts them, and drives a headset 61, to obtain an audio indication of the intensity of the simulated radioactive source. Also these amplified square waves are coupled to an integrating circuit 55 which converts the square waves into a DC signal, which drives an indicating meter 59, thereby providing a visual indication of the intensity of the simulated radioactive source.

*Detailed description and operation of the schematic of FIG. 3*

The overall device includes a triggering-detector system. This system includes a triggering means and a detector means. For convenience of describing the schematic circuit of FIG. 3, such description is broken down into four basic sections, as was previously done in describing FIG. 1. There are four such sections, a triggering section, an optical section, a detector section, and a rate meter section.

*Triggering section*

The triggering section basically includes a triggering means and a source of primary radiation of a first frequency. The triggering means is sub-divided further into a converter of source of alternating current voltage, a dual polarity direct current source, and a lamp triggering source or pulsing means. The source of primary radiation of a first frequency basically includes an ultra-violet lamp 33, and its associated filter (not shown), which provides the radiation of a first frequency. A minus 6.6 voltage DC battery 25 is coupled to a DC to AC power converter 27, so as to provide operating potential therefor. This DC to AC converter 27, provides at its output a 400 volt square wave output. This converter 27, is a conventional DC to AC saturable core converter. Basically, the operation is as follows: one of the transistors supplies current to the primary winding 65 of the saturable core oscillator. This current slowly saturates the core and when the core is saturated by said current, the magnetic field then becomes static. This causes the circuit to switch over so that the other transistor conducts. This transistor, previously off, allows the current provided by the 6.6 volt source 25, to flow through the same saturable core, in the reverse direction, to saturate the core. The resulting output is a square wave voltage at a particular frequency dependent upon the particular values of the components of the circuit. A feedback winding 67, is supplied which provides current to the bases of each of the transistors thereby allowing these transistors to either conduct or remain cut-off. Additionally, a voltage divider at the feedback center tap 69 supplies forward bias for starting. By means of a stepped winding 71, on the output core, the square wave voltages at the output of the inverter are stepped up to a large value, in this case, 400 volts each. The square wave output voltage of the converter 27, are then coupled to the input of the dual polarity direct current voltage source 29, to provide two voltages, a minus 800 volt DC supply, and a negative 800 volt DC supply. This dual polarity direct current voltage source 29, includes basically: a first half-wave voltage-doubling circuit 73, for providing a positive 800 volt output, and a second half-wave voltage-doubling means 75, for providing a negative 800 volts DC output voltage. Additionally, there is a means, capacitor 77, for coupling the voltage fluctuations resulting from the variation in loading at the positive 800 volt output so as to reduce he fluctuation effects on said second half-wave voltage doubling means 75, output voltage due to the loading on the first half-wave voltage doubling means 73. This results in a substantially constant second direct current voltage provided at the output of the second half-wave volage doubling means 75. The positive voltage is supplied to the lamp 33, the positive 800 volts is supplied for the pulsing means, the lamp triggering circuit 31, and the negative 800 volts is supplied for the photomultiplier tube 35, and the frequency control noise generator means, described infra. The positive 800 volts line voltage developed at the output of the dual polarity direct current voltage source 73, is used to charge a storage capacitor 79, which discharges through the ultra-violet lamp 33, when the ultra-violet lamp is triggered by the lamp triggering circuit 31. Thus, the 800 volt outline line looks like a fluctuating DC voltage because of this recurrent lamp, firing which of course, changes the loading on the output of the positive 800 volt line. Due to such lamp 33, firing, the voltage appearing at the output of the negative 800 volt line also appears to be fluctuating. The fluctuations in the negative 800 volt line due to such variable loading are compensated for by reflecting back, by means of capacitor 77, the fluctuations in the positive 800 volt supply section of the dual polarity DC voltage source. In simple terms, capacitor 77, coupled the positive voltage fluctuations from the positive 800 voltage terminal to the negative 800 voltage terminal, in such a way that the fluctuations are added to the negative voltage. Since these fluctuations are essentially the reverse of the fluctuations reflected through the AC source to the negative line, the result is to iron out the fluctuations in the negative line. The use of the plurality of voltage doublers 73 and 75, are necessary in order to provide an 800 positive and negative volt direct current voltage output from the converter 27. These first and second voltage doublers 73 and 75 rectify and double the 400 volt output voltage from the DC to AC converter means 27, which is coupled to its input. Now particularly referring to FIG. 6 and also FIGS. 4 and 5 all of which describe the rectifier system and its operation a 400 cycle square wave voltage, represented by curve E, FIG. 5, which when applied to the dual polarity direct current voltage source, charges up in increments, the storage capacitor 79, to plus 800 volts. The time which it takes to charge this capacitor 79, is actually one hundred cycles. For each cycle approximately 9 volts are charged in the storage capacitor 79. The actual voltage depends upon the values of capacitor 81, 83, resistor 85, 79, and of course the amount of voltage stored in 79 already. When the storage capacitor 79 is charged to approximately to 800 positive volts, the U.V. lamp 33 is triggered, which discharges the voltage stored in this storage capacitor 79. In a similar manner the voltage at point B is charged up to minus 800 volts. This is illustrated by Curve II, FIG. 6. The charging of the storage capacitor 79 to approximately 800 volts is illustrated by Curve I of FIG. 6. At the time the U.V. lamp 33, is ignited the whole dual polarity DC voltage source is loaded, and this results in a voltage being reflected through capacitor 77, thereby providing an output voltage at B, which is substantially a minus 800 volt DC, with a slight ripple. As seen in Curve II, the voltage between points A and C is a varying AC voltage. It is observed that this reflection voltage is fed back, the magnitude of which is determined by the value of the coupling capacitor 77, and is so proportioned as to fill in the peaks of the represented voltage by Curve II so as to provide substantially a non-varying 800 volt negative 800 DC output at D, similar to that illustrated by Curve IV. Thus, in effect the fluctuations in the plus 800 volt direct current voltage line has been used to provide power to smooth out the fluctuations in the minus 800 volt line, thereby effectively providing a constant negative 800 output voltage.

Figure 4:
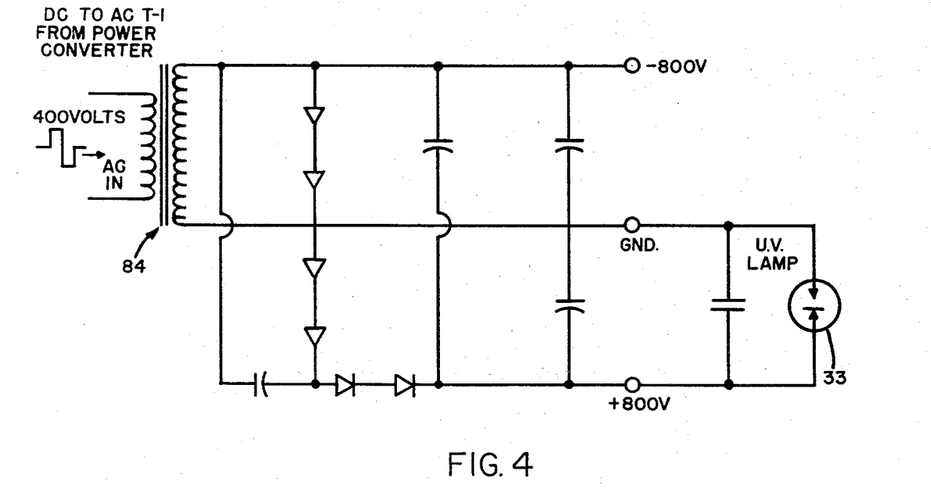
FIG. 4 is a schematic of the rectifier system embodying the invention.
Figure 5:
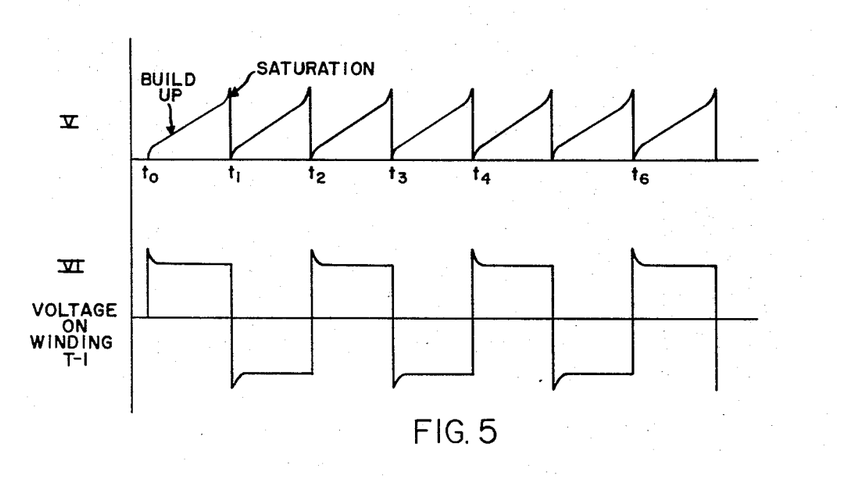
FIG. 5 illustrates the input waveforms of the rectifier system of FIG. 4.
Figure 6:
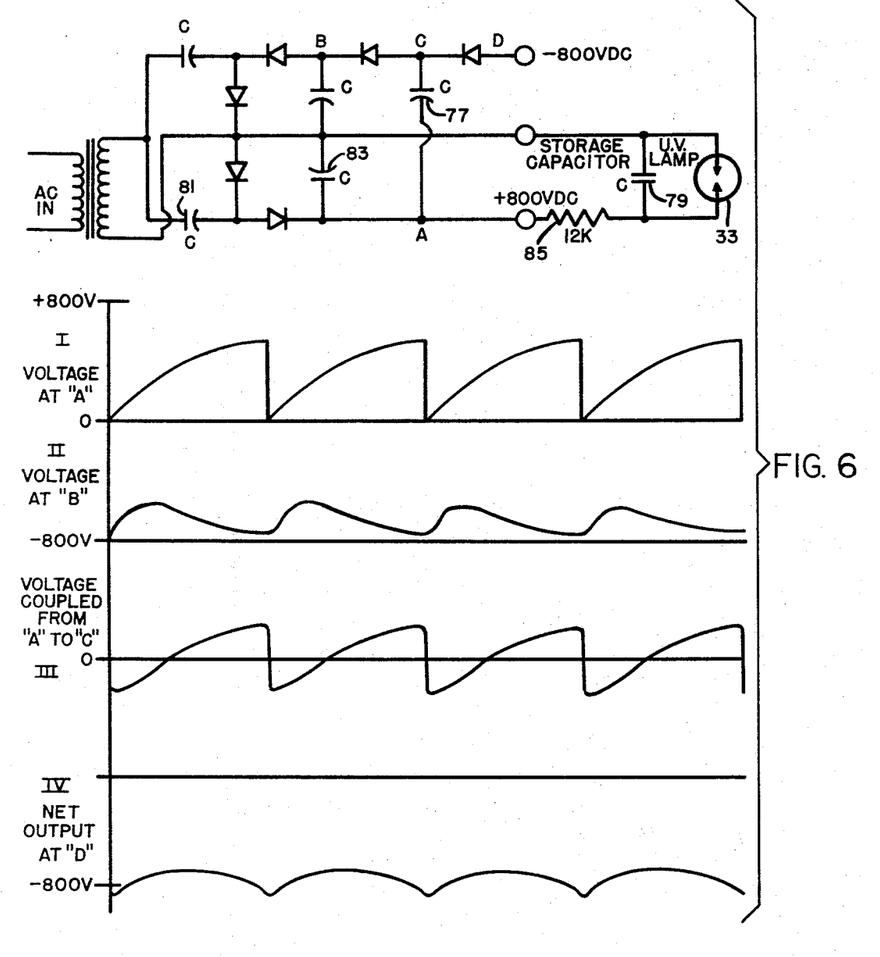
FIG. 6 is a simplified schematic, with waveforms of the rectifier system embodying the invention.

The schematic of FIG. 4, and the wareforms illustrated in FIG. 5 describe the operation of said circuit. Curve VI of FIG. 5, illustrates the input square-wave signal to the primary of the input transformer 84, and the build-up and saturation of its core.

This 800 volt line is then coupled to the pulsing means or the U.V. lamp triggering circuit 31. This voltage is coupled through resistor 85 to the storage capacitor 79, and is also coupled to a trigger storage capacitor 87 through resistor 89. This trigger storage capacitor 87 is charged up through resistor 89 by said 800 volt supply. This capacitor 87 charges up to a voltage of approximately 360 volts. When approximately 360 volts are charged in the triggering capacitor 87, the cold cathode trigger tube 91, which is coupled across said triggering capacitor 87, breaks down between the grid and cathode thereof, thereby ionizing the cold cathode trigger tube 91, which immediately results in the charge stored on the trigger capacitor 87 to discharge through the anode 93, to the cathode 95 of said tube. The discharge current flows through this gas trigger tube 91, to the input side of a pulse transformer 97, in series with the gas trigger tube 91. A very high peak current is produced at the output of this pulse transformer 97, as the pulse transformer has a high step-up ratio, which is sufficient to provide a starting voltage to the U.V. lamp 33 electodes. It should be observed that when the trigger tube's anode to cathode voltage reaches a certain value, which is slightly below 360 volts, grid 99 begins to draw current through the ionization of the gas between the grid 99 and the cathode 95. This current is limited by resistor 101. However, when such current reaches a certain value, ionization spreads rapidly to the anode 93 and causes this tigger tube 91 to fire, thereby producing a voltage pulse across the transformers primary as previously described. A resistor 103 is connected from the positive 800 volt line to a "keep alive" electrode 105 in the trigger tube 91. This circuit keeps a small glow going inside the trigger tube 91 so that ionization will always occur. The secondary of this pulse transformer 97 is then capacity coupled to each of the 6 trigger electrodes 107 of the U.V. lamp 33 of the source of primary radiation of a first frequency. Thus each of these triggering electrodes 107 has a high voltage pulse applied to it, resulting in an arc traveling between the electrodes 107 in the tube. These pulses provide a small ionization to the lamp 33, putting it in condition for the storage capacitor 79 to discharge therethrough resulting in a bright pulse of light being generated by said U.V. lamp 33. The trigger electrode 109 near a sparker electrode, which is near the cathode, produces a short bright arc when the trigger pulses are applied, in a manner similar to the "keep alive" electrode of trigger tube. This insures ionization in the tube under all conditions. After the triggering voltage is applied to all the 6 trigger electrodes 107 inside the U.V. lamp 33, the lamp's resistance drops substantially. Immediately thereafter the storage capacitor 79, which has previously been charged to about 800 volts between firing discharges there through in about one and one-half microseconds. The electrodes 107, inside the lamp guides the arc produced along a very well defined path, making the light easier to focus. Almost all the energy stored in the storage capacitor 79 is used up in the arc and produces a very bright blue white light or pulse of radiant energy of a first frequency after it has been filtered by its associated filter.

*Optical section*

As previously stated, various forms of optical systems may be utilized with the instant invention. The simple optical system used by United States Patent 2,900,740, issued to Brault, could be efficiently used in this overall device. Another form of optical system which may be used with the invention is described in co-pending application No. 304,704, filed Aug. 26, 1963. Basically, this later optical system's ultra-violet light, produced by a U.V. lamp, passes through a first filter which passes only light of a first frequency. This light of a first frequency is focused at a contaminant on a surface. If this contaminant is of a particular form of phosphor, secondary radiation of a longer and different frequency will emanate therefrom in response to the ultra-violet light, the radiation of a first frequency impinging thereon. Such emanating secondary radiation of a different frequency is then directed through the optical system through a second filter which allows only light or radiation of a second frequency therethrough which is subsequently detected by a multiplier tube.

*Detector section*

The detector section comprises, detection means adapted to receive a secondary frequency, a detecting means, and a means for developing random output electrical pulses. The detection means adapted to receive a secondary radiation includes a photomultiplier tube 35 referred to as a P.M. tube, and its associated filter (not shown). The detecting means of the sub units making up the detector section includes a fast time response filter means, emitter followers 39, and conversion means, which include a peak rectifier 41 and filter 43. The third sub unit which makes up the detector section, the means for developing random output electrical pulses, includes eight additional units.

Figure 7:
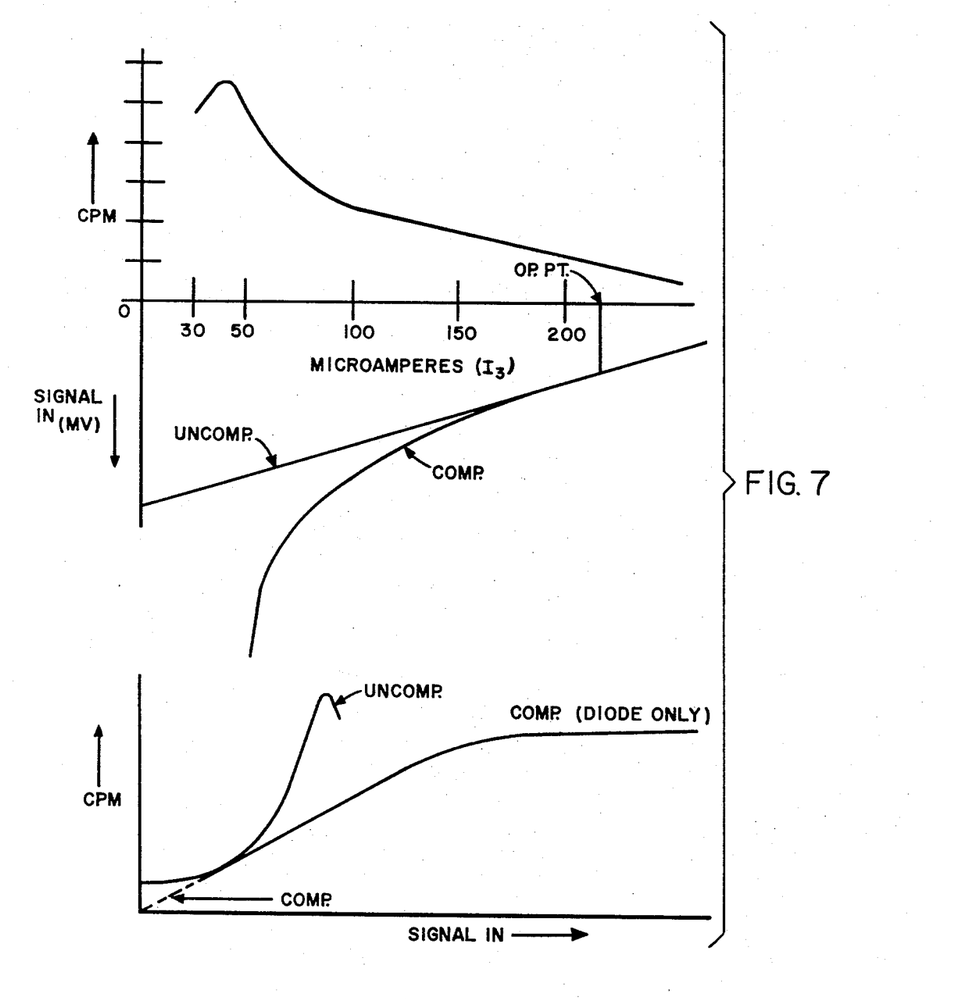
FIG. 7 illustrates graphically the compensation used in the simulated radioactive radiation meter.
Figure 8:
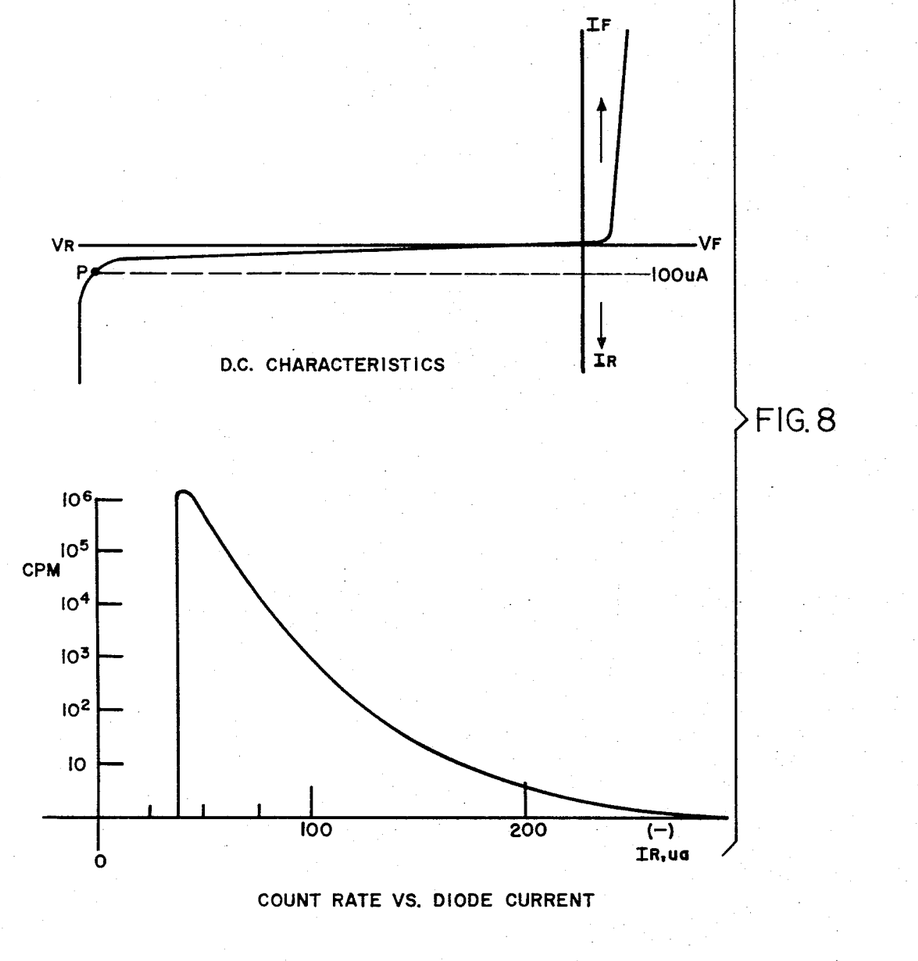
FIG. 8 illustrates graphically the characteristics of the zener diode used in the noise generator circuit.
Figure 9:
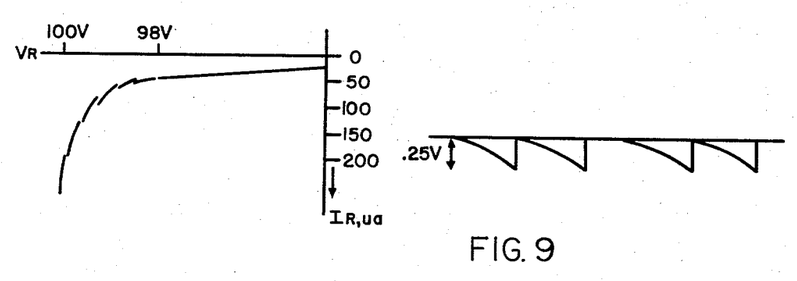
FIG. 9 illustrates the discontinuities of the zener diode used in the noise generator circuit, and the resulting noise pulses generated.
Figure 10:
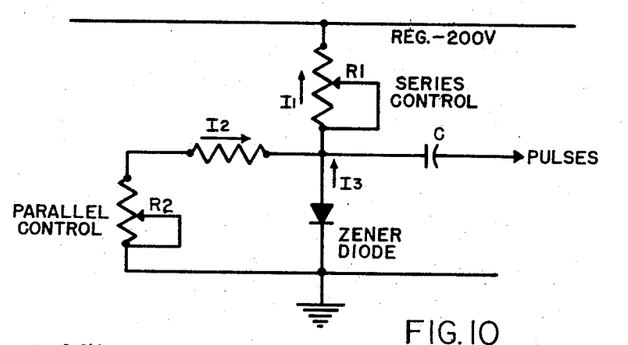
FIG. 10 is a simplified schematic of the noise generator circuit embodying the invention.
Figure 11:
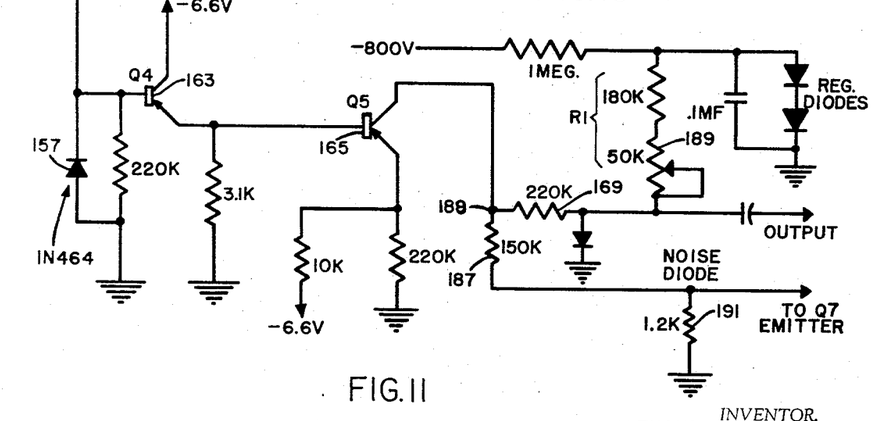
FIG. 11 is a detailed schematic of the noise generator and associated circuitry embodying the invention.

They are a first compensatory means or signal limiting means or diode compensating means, emitter follower stage, modulating means which include variable impedance means, noise source means having a controllable frequency which includes a zener diode and bias means, limiter means which is the first stage of the noise amplifier, controllable transmission means which is the second stage of the noise amplifier, second compensatory means which includes resistor 187, and an adjustable discriminato means. The photomultiplier tube 35, and its associated circuitry of the detection means adapted to receive a secondary radiation, are conventional. Light radiation of a second frequency incident on the cathode 111, of the P.M. tube 35 results in the generations of electrons, thereby providing a small voltage. These electrons are accelerated by anode number 113 and subsequently by anodes 114 to 121, toward element 123. The rate of acceleration depends on the particular voltages applied to said anodes 113 to 121 by the voltage divider network 125. This in effect results in a multiplication of this input signal, generated by the detection of the light of a secondary frequency, which is dependent upon the overall gain of the photomultiplier tube circuit. In view of the extremely short duration of the light pulses emanating from the U.V. lamp 33, such precludes the use of any slow response time detector. As relatively high light intensities are encountered, the P.M. tube's sensitivity is reduced by operating it at 800 volts. The output of the P.M. tube is fed over line 217 fast time response filter means 129 of the detecting means. Because the P.M. tube 35 puts out two types of signals; fast pulses from the contaminant, and relatively slow, including DC signals from outside light sources, a fast time response filter 129 which includes resistor 131 and capacitor 133, are utilized at the output thereof. Fast signals will be able to pass through this filter circuit 129 to its output while the other signals will not. This filter 129 is particularly useful in eliminating 60 cycle hum in the 800 volt power supply and of course, any other undesirable input signals. Such fast signals are fed from the output of the filter over line 135 to the first stage of emitter follower unit 137. The amplified output from emitter follower 139 is developed across resistor 141 and is subsequently fed over line 143 to the base input of a second emitter follower 145 which includes transistor 147 which additionally amplifies the voltage coupled thereto, and develops an output voltage developed across resistor 149 which is subsequently coupled over line 151 to the input of the peak rectifier 41 of the conversion means. The peak rectifier 41 which includes diode 153 converts such fast pulses to unipolar pulses and feeds them over line 155, as the pulses at the output of the anode 123 of the P.M. tube 35 are negative going and are approximately of 1½ microseconds duration. The input to the rectifier 153 is also negative as such pulses have not been phase reversed by the emitter follower unit 137. The amplitude of the output voltage appearing at the output of the rectifier 41 is therefor proportional to the intensity of the light detected. This output from the peak rectifier 41 is then fed to a filter circuit 43. The result is a DC voltage. However, this DC voltage is not a pure DC voltage, as it contains a required "ripple." Relatively pure DC can be obtained only at the expense of response time, and if too much filtering is used the signal will not appear quickly at the input to the next element; thus a compromise between response time and this DC signal must be made. The signal is then coupled to the first compensatory means of the means for developing random output electrical pulses, and this first compensatory means includes diode 157 which is used to compensate for subsequent non-linearities in the noise zener diode 47 which is described infra. This DC voltage is amplified by a temperature compensated emitter follower 159 to reduce the impedance of the DC voltage source. Temperature compensation is achieved with a thermistor 161 in the emitter circuit 159 so that the DC voltage across the load resistor changes to compensate for the temperature shifts in the DC circuit and the following circuit. As the temperature increases, the emitter circuit and the current gain of the transistor 163 increase and will produce larger voltage drops across the emitter resistance. However, since the emitter resistance decreases with temperature, the effect is that the voltage change is in the opposite direction, that is lower voltage drops are produced at higher temperatures. This is necessary to compensate the circuits which follow the DC circuits. The output of the emitter follower 159 is then coupled to a modulator means 160, which includes transistor 165 which is similarly temperature compensated. The output of this emitter follower is coupled over line 167 through resistor 169 to the noise diode 47. The diode 47 is part of the noise source means which has a controllable frequency, and consists basically of two units; the zener diode 47 and a bias means. The zener diode 47, and a bias means, in addition to a means for modulating the current flowing through said zener diode, are used as a random noise pulses generator in order to simulate the output of a real radiation detector. Certain zener diodes produce these noise pulses when they are operated at "knee" of their reverse volt ampere characteristic curves. This discontinuities in the curve give rise to completely random noise pulses. Referring now to FIGS. 8, 9, 10, and 11, the height of these pulses are essentially constant for a given diode and increases as the breakdown voltage rating increases. Typically, a ten volt zener diode produces approximately 20 millivolt pulses and a 100 volt diode produces up to 250 millivolt pulses. The repetition rate of these pulses is random, but their count rate or average random repetition rate or average rate of occurrence or frequency, changes proportionally as the current through the zener diode changes. This is illustrated in FIG. 8. It is observed that when a diode is operate dwell down on the curve at higher currents, there are essentially no pulses. As the current is reduced, so that the operating point travels around the "knee" of the curve, the pulses appear and their frequency increases until the point is past the "knee"; here again the noise pulses disappear. The diode chosen for this system preferred embodiment produces no noise pulses at a 100 volts, when 300 micro-amperes of current flow therethrough. When the current is reduced, noise pulses of a few counts per minute start to appear at about 190 micro-amperes, and then more rapidly until at 70 micro-amperes the rate is as high as a quarter of a million counts per minute. Referring to FIG. 10, there is shown a simplified circuit for extracting these noise pulses. Current I flows through the series resistor R1 from a regulated voltage source, and is constant. This current splits into two branches, I2 through the parallel resistance, and I3 through the zener diode. The series control can, therefore, be adjusted to pass the desired starting current through the noise diode. In this system, the current is usually adjusted so that about 200 micro-amperes flow in the zener diode and 200 in the parallel branch. As the resistance of the parallel branch decreases, more current will flow through it. Since I1 is constant for any particular setting of R1, if I2 increases then I3 must decrease. The parallel resistance control R2 is adjusted to give a linear change in count rate of the noise pulses which appear as the zener diode is current starved, and noise pulses appearing across the diode are capacitively coupled to an amplifier. In the actual device, as shown in FIG. 3, the variable portion of the parallel branch is a modulating means 160 which includes a transistor 165 which is controlled by the signal from the DC circuit 41 and 43 coupled to the input of said modulating means 160. The resistance of said modulating means 160 changes with signal is not made linear because the noise generated from the diode is not linear with current changes, so as to provide compensation for such non-linearity. The first compensatory means includes a silicon diode 157 which is connected from the base to ground of the emitter follower 159 which includes transistor 163. For low input signal levels coupled to the input of said emitter follower 159, and therefore at one terminal of said diode 157, this diode presents a high impedance, and therefore has no effect. However, as the signal magnitude increases this diode's impedance decreases non-linearly, and in such a way to compensate for the non-linear characteristics of the zener noise output circuit. This is illustrated by FIG. 7 which shows the uncompensated diode's characteristic counts per minute, referred to as C.P.M. versus signal $In$. As the compensated diode's input signal approaches some maximum the output slowly levels off to a substantially constant value. Thus the signal level for such magnitude is limited to this maximum level. Therefore no further change in the noise diode characteristic occurs beyond this level. The current value flowing therethrough is chosen so as to be just within the maximum count rate, which is prior to the point where the noise pulses cease to appear. The result of this is to provide saturation effects, thereby more realistically simulating an actual radioactive radiation counter. The output from the noise source means 47 is then coupled to the base of transistor of 173 which is part of the limiter means 175, or the first noise amplifier. Prior to the noise pulses being coupled to said limiter means 175, they are shortened in duration by a RC differentiating circuit 177. The emitter resistance 179 of this limiter means 175 is high so that this stage has a low voltage gain. Additionally, the base resistor 181 also is high. Thus, because both the base resistor 181 and the emitter resistor 179 are of high values, a slight reverse bias is applied to this stage. A signal applied to such stage 175 must reach certain level before any output signal appears, that is to say an input signal will be amplified by this stage 175 when it exceeds the threshold bias. The purpose for this threshold bias, is because the noise zener diode has an inherent amount of low level noise, which should not to be confused with the noise pulses, as this low level noise is always present, this limiter 175 helps to eliminate this type of noise from the output circuit. The signals from the output of this limiter stage 175 are then fed to the input of a controllable transmission means or variable gain amplifier 183 for low level signals. This variable gain amplifier 183 includes transistor 185. The output of the modulator means 160 is coupled through resistor 187, and the output signal of the modulator 160 is then coupled to the emitter of transistor 185. Referring now to FIG. 7, it is observed by the use of first compensatory means, the diode 157, there still exists output readings of counts per minute, during low level signal inputs. The purpose of the second compensatory means and the controllable transmission means 183 are to provide low level signal compensation. The operation of such means are described now with reference to FIG. 11. As seen in FIG. 11, the collector of the transistor 165 which is part of the modulator means 160 is connected to a tap of the parallel branch resistor 169 and 187. The zero signal voltage at this tap 189 is about −35 volts. As the signal into the transistor base is increased, the collector draws more current and lowers, towards zero, the potential voltage at this tap 189. When this transistor 165 saturates, or is limited by the compensating diode described supra, 157, the voltage is nearly zero. This means that the current in 187 is reduced as the signal level is increased. This current change is used advantageously to provide this low level signal compensation. As observed, the parallel resistor 187 is returned to the emitter of transistor 185. Additionally, resistor 191 connected from emitter to ground, develops a voltage due to the current in resistor 187 at zero input signal. This resulting voltage biases the emitter of transistor 185 in the reverse direction and any pulse from the previous stage 175 must overcome this reverse bias before it can appear in the output. This bias is so proportioned to the signal level so that even if the zener diode should produce a few counts at zero DC signal input the output pulses would be very small. Thus the effect of this limiter stage is to remove much of the low level non-linearity and therefore, provides low level signal compensation. As the input signal increases from zero, the minus 35 volts at the collector of modulator transistor 165 immediately starts to drop towards zero. The current in resistor 187 is reduced, and therefore, the reverse bias on this output stage of the noise pulse amplifier 49, that is the second stage noise amplifier 183, of the noise pulse amplifier 49. Some of the noise pulses are produced at the output of this stage, even though the count rate of the noise pulses has not yet changed. As the input signal increases the reverse bias on transistor 185 essentially disappears and the rest of the change is dependent upon count rate change only. This is shown graphically in FIG. 7. This action may be considered to be the reverse of an automatic volume control (in that as the input signal is coupled to transistor Q4, eventually coupled to Q5 and coupled over resistor R33 to Q7 will decrease the amount of reverse bias on transistor Q7. Thereby allowing it to amplify pulses which are coupled at the input base thereof. This results in the linear characteristics of the input signal from transistor Q4 at low level signal responses). The output of the second compensatory means 183, which is the second stage of the two-stage noise amplifier 49, its output coupled over line 190 to the input of the rate meter section.

*Rate meter section*

Referring to FIG. 2, the rate meter section basically includes an adjustable discriminator means 51, or discriminator amplifier, a monostable multivibrator 53 and an amplifier 55 which drives a head phone 61 connected thereto, and also an integrating circuit 57. This latter integrating circuit output is coupled to a meter 59. The output of the second compensatory means 183, is coupled to the input base of the adjustable discriminator 51, which includes transistor 193. Although the adjustable discriminator means 51, is described as part of the rate meter section, it is nevertheless considered one of the elements of the detecting means. The discriminator 51, includes a transistor 193 wherein small signals coupled to the base thereof result in no output. This transistor 193 is biased off, no base current, because I.C.O. flowing in resistor 195 establishes the emitter at a negative voltage with respect to the base. To be amplified, an incoming signal must exceed this value in addition to the forward drop of the base-emitter diode. This amplifier 51, operates in a manner similar to the first stage 175 of the noise pulse amplifier 49, which includes transistor 173, which is described supra, except that in this state 51, the reverse bias is controlled by varying the emitter resistor. The emitter resistor 195 for varying the reverse bias is mounted in a convenient place so that circuit adjustments can be made to suit desired operating conditions. It was previously stated that very small noise pulses are present in the output of the noise pulse amplifier 47 of the second stage 183, at zero input signals. The emitter variable control 195 in this adjustable discriminator stage 51, makes it possible to adjust the circuit so that these noise pulses can produce a "background" count if desired. Also, the noise pulses although essentially constant, do have a slight variation in height, so that this control can be used to calibrate the device is desired. Pulses of a height suitable to trip the next stage appear at the collector of this stage 51. These output noise pulses are then coupled to the input of a monostable multivibrator 53. The two transistors 196 and 197, which make up such multivibrator 53, have a common emitter resistor 199. One transistor, 197, is biased so that it normally conducts so that the other transistor 195 is normally cutoff. When pulse of sufficient amplitude is applied to the base of the conducting transistor through capacitor 201, it is fed back through the common emitter circuit of the two transistors and causes the circuit to flip over so that the other transistor is cutoff. The diode 203, in the collector circuit of the second transistor 197, limits the cutoff voltage on the collector to a fixed value. When the temperature varies, the cutoff current which is affected thereby, does not vary this voltage. A resistor 205, and a capacitor 207, maintains this point at approximately minus 4 volts, which is the limit that the collector voltage can reach. The pulse width of the output pulse is determined by the time it takes the voltage at the base of this transistor to rise from minus 4 volts to the saturation voltage of about .25 volt, through the capacitor 201 and resistor 209. When the voltage rises to that value, the circuit flips back to its original state. The output pulse is therefore, a square-wave, of a fixed height and duration, over a wide temperature range. One of these square waves is produced for each input noise pulse received from the adjustable discriminator 51 means, except that if these pulses are closer together than the duration of the square wave some are lost. In this device this fact is not considered to be important. In other circuits of this type, a coupling capacitor could be changed by the range switch as the count range is increased so as to avoid this. This reduces counting losses by shortening the pulse, and allowing more pulse per minute before coincident losses becomes noticeable. The output square wave from the monostable multivibrator 53 are then coupled to the input of an amplifier stage 55 which inverts them and drives a head set 61 through a capacitor 211. This results in a clicking being heard in the head set 61, for each noise pulse received. Additionally, the square waves amplified by this amplifier 55 are also coupled to a diode integrating circuit 57. This circuit inverts the amplified square waves into a D.C. signal to drive the indicating meter 59. It is formed of a series resistor 213, a selected series range capacitor 214, and shunt and series diode 215, and 217, a storage capacitor 219, and a resistance divider circuit for the meter, 221 and 223. The series capacitor 214 charges through the series resistor 213 and shunt diode 215. At the same time, the storage capacitor 219 charges to a voltage which depends upon the ratio of the series, capacitor 214 to the storage capacitor 219. The voltage drives the meter 59 through the resistive circuit. The discharge time constant for this circuit is fixed at about 0.2 second and compares favorably with that of actual radioactive radiation meter. The series diode 217 holds the voltage on the storage capacitor 219 while the input square wave decays. During the decay the series capacitor 214 discharges through the shunt diode 215 so that it is ready for another pulse. If a second pulse comes before the storage capacitor 219 discharges through the meter circuit (i.e., less than the 0.2 second time constant) then the second voltage pulse is added to the first. It readily is seen that the voltage to which the storage capacitor 219 is charged depends upon the frequency which the pulses are applied, or in other words, the meter reading is directly proportional to the count-rate. The range series capacitor 214 is selected by the range switch 221 so that the device covers four ranges. The largest capacitor serves for the thousand counts per minute (1 K.) range. When the next capacitor is selected, (ten thousand C.P.M.) it takes ten times as many counts per minute to charge this storage capacitor because the series capacitor is one tenth as large. This is repeated for the hundred thousand and one million C.P.M. ranges, using capacitors one tenth as large in each step.

Obviously many modifications and variations of the present invention are possible in the light of the above teachings. It is therefore, to be understood that within the scope of the appended claims the invention may be practiced otherwise than as specifically described.

What is claimed is:

1. A simulated radioactive radiation meter comprising:
    a source of pulses of primary radiation of a first radiation frequency;
    photomultiplier means for receiving pulses of secondary radiation of a second radiation frequency from a substance in response to radiation of said first frequency directed thereon, said photomultiplier means providing voltage pulses corresponding to the intensities of said pulses of said secondary radiation;
    voltage pulse detecting means connected to said photomultiplier means and providing a direct current voltage signal which is proportional to the intensity of secondary radiation incident on said photomultiplier means;
    random electrical pulse generating means coupled to said voltage pulse detecting means and responsive to said direct current voltage signal to provide a random electrical pulse output having an average rate of occurrence which is directly proportional to said direct current voltage signal; and
    indicator means coupled to said random pulse generating means for providing an indication of said random electrical pulse output.

2. The device as in claim 1 wherein said detecting means includes:
    fast time response filter means for transmitting only fast voltage pulses provided by said photomultiplier means; and
    conversion means, coupled to said fast time response filter means, for converting said transmitted fast pulses into said direct current voltage signal.

3. The device as in claim 1 wherein said means for developing random output electrical pulses includes:
    noise source means for generating noise pulses at a random repetition rate and having a controllable frequency; and
    modulating means, coupled to said noise source means, for varying the frequency of said noise source means in response to said direct current voltage signal.

4. The device as in claim 3 wherein said noise source means includes:
    a zener diode having nonlinear count rate versus current therethrough characteristics; and
    wherein said means for developing random output pulses further includes:
        first compensatory means, coupled to said modulating means, having nonlinear impedance characteristics, for compensating for the nonlinear characteristics of the zener diode, thereby providing more linear operation to the overall device.

5. The device as in claim 4 wherein said means for developing random output pulses further includes:
    limiter means, coupled to said noise source means, for transmitting those portions of the noise pulses which exceed a fixed reference voltage level, thereby eliminating low level noise attributable to the zener diode of the noise source.

6. The device as in claim 4 wherein said means for developing random output pulses further includes:
    controllable transmission means coupled to said noise source means; and
    second compensatory means, coupled to said modulating means and said controllable transmission means, for varying the transmissivity of said controllable transmission means as a function of the magnitude of low level modulating signals, thereby providing low level signal compensation for the nonlinear characteristics of the zener diode.

7. The device as in claim 4 wherein said means for developing random output pulses further includes:
    controllable transmission means coupled to said noise source means; and
    second compensatory means, coupled to said modulating means and said controllable transmission means, for compensating for the low level signal nonlinear characteristics of the zener diode.

8. The device as in claim 7 wherein said means for developing random output pulses further includes:
    adjustable discriminator means, coupled to said controllable transmission means, for varying the background count and for calibrating the overall device.

References Cited

UNITED STATES PATENTS

| | | | |
|---|---|---|---|
| 2,551,542 | 5/1951 | Marsh et al. | 250—71 |
| 2,900,740 | 8/1959 | Brault et al. | 35—1 |
| 2,935,613 | 5/1960 | Tirico | 250—71 |
| 3,208,159 | 9/1965 | Filipov | 35—1 |
| 3,243,588 | 3/1966 | Scherbatskoy | 250—71.5 |

JEROME SCHNALL, *Primary Examiner.*

EUGENE R. CAPOZIO, *Examiner.*

R. W. WEIG, *Assistant Examiner.*